United States Patent
Biris et al.

(10) Patent No.: US 11,502,616 B2
(45) Date of Patent: Nov. 15, 2022

(54) METHOD OF OPERATING A POWER GENERATION SYSTEM IN AN OVERMODULATION RANGE

(71) Applicant: VESTAS WIND SYSTEMS A/S, Aarhus N (DK)

(72) Inventors: Ciprian Biris, Hinnerup (DK); Kent Tange, Ry (DK); Gert Karmisholt Andersen, Hovedgård (DK); Duy Duc Doan, Tilst (DK); Torsten Lund, Fredericia (DK); Lars Meyer, Nørager (DK)

(73) Assignee: VESTAS WIND SYSIEMS A/S, Aarhus N (DK)

( * ) Notice: Subject to any disclaimer, the term of this patent is extended or adjusted under 35 U.S.C. 154(b) by 56 days.

(21) Appl. No.: 17/278,197

(22) PCT Filed: Sep. 11, 2019

(86) PCT No.: PCT/DK2019/050266
§ 371 (c)(1),
(2) Date: Mar. 19, 2021

(87) PCT Pub. No.: WO2020/057703
PCT Pub. Date: Mar. 26, 2020

(65) Prior Publication Data
US 2021/0376749 A1     Dec. 2, 2021

(30) Foreign Application Priority Data

Sep. 19, 2018 (DK) .......................... PA 2018 70609

(51) Int. Cl.
*H02M 5/458* (2006.01)
*H02P 9/02* (2006.01)

(52) U.S. Cl.
CPC .............. *H02M 5/458* (2013.01); *H02P 9/02* (2013.01)

(58) Field of Classification Search
CPC .. H02M 7/5395; H02M 7/5387; H02M 5/458; H02P 9/02; H02P 27/08; H02P 21/00
See application file for complete search history.

(56) References Cited

U.S. PATENT DOCUMENTS

| | | |
|---|---|---|
| 2005/0029982 A1 | 2/2005 | Stancu et al. |
| 2012/0187876 A1 | 7/2012 | Perisic et al. |

(Continued)

FOREIGN PATENT DOCUMENTS

| | | | | |
|---|---|---|---|---|
| WO | 2012083963 A1 | 6/2012 | | |
| WO | WO-2012083963 A1 * | 6/2012 | ............. | F03D 9/255 |
| WO | 2020057703 A1 | 3/2020 | | |

OTHER PUBLICATIONS

Danish Patent and Trademark Office 1st Technical Examination for Application No. PA 2018 70609 dated Mar. 15, 2019.

(Continued)

*Primary Examiner* — Adolf D Berhane
(74) *Attorney, Agent, or Firm* — Patterson + Sheridan, LLP

(57) ABSTRACT

This invention concerns a method of controlling a line side converter of a power converter system operating in an over-modulation range. The line side converter comprises a controller comprising a feedback control module configured to output a feedback control signal for modifying a drive signal received by a modulator. The method comprises determining a modulation index within the over-modulation range; and, controlling the feedback control module to adjust the feedback control signal based on the modulation index.

20 Claims, 10 Drawing Sheets

(56) References Cited

U.S. PATENT DOCUMENTS

| | | |
|---|---|---|
| 2013/0265809 A1 | 10/2013 | Gupta et al. |
| 2014/0008912 A1 | 1/2014 | Gupta et al. |
| 2016/0254760 A1 | 9/2016 | Zhang et al. |
| 2017/0279371 A1 | 9/2017 | Yamashita et al. |
| 2018/0171976 A1* | 6/2018 | Tan .................. H02P 9/007 |
| 2020/0392942 A1* | 12/2020 | Andersen ............ H02P 29/68 |
| 2021/0351589 A1* | 11/2021 | Lund .................. H02J 3/381 |
| 2021/0351714 A1* | 11/2021 | Biris .................. H02M 1/44 |
| 2022/0069580 A1* | 3/2022 | Nielsen ............... F03D 7/0284 |

OTHER PUBLICATIONS

J. Holtz and Lotzkat A. Khambadkone, "On Continuous Control of PWM Inverters in the Overmodulation Range incuding the Six-Step Mode," IEEE, vol. 18, Nov. 9, 1992, pp. 310-312.

PCT Notification of Transmittal of the International Search Report and the Written Opinion of the International Searching Authority, or the Declaration for Application No. PCT/DK2019/050266 dated Nov. 8, 2019.

\* cited by examiner

METHOD OF OPERATING A POWER GENERATION SYSTEM IN AN OVERMODULATION RANGE

FIELD OF THE INVENTION

This invention relates to a method of operating a power generation system for use in a wind turbine. In particular, it relates to a method of controlling a power converter of the power generation system.

BACKGROUND

The output voltage of a power converter can be maximised when the power converter is operated in an over-modulation range. Understanding the performance of the power converter in the over-modulation range is important, not least with a view to protecting sensitive power electronics in the power converter and the power generation system to which the power converter belongs, but also to ensure the stability and robustness of the power generation system. Various control modules are used for diagnosing and controlling the performance of the power converter. However, the conventional control strategies used by the control modules are not suitable for testing and benchmarking the performance of the power converter in the over-modulation range.

It is against this background that the invention has been devised.

STATEMENTS OF INVENTION

According to a first aspect of the invention, there is provided a method of controlling a line side converter of a power converter system operating in an over-modulation range, the line side converter comprising a controller comprising a feedback control module configured to output a feedback control signal for modifying a drive signal received by a modulator, the method comprising: determining a modulation index within the over-modulation range; and, controlling the feedback control module to adjust the feedback control signal based on the modulation index.

Preferably, the feedback control module is controlled between a first operational state when the modulation index equals a first parameterised modulation index value and a second operational state when the modulation index equals a second parameterised modulation value.

Preferably, controlling the feedback control module comprises controlling activation of the feedback control module, and wherein the first operational state comprises a fully enabled state and the second operational state comprises an inactive state.

Preferably, the first and second parameterised modulation index values are within the over-modulation range.

Preferably, the first parameterised modulation index value is in a lower section of the over-modulation range and the second parameterised modulation index value is in an upper section of the over-modulation range. Preferably, the feedback control module is inactive when the modulation index equals a modulation index indicative of six-step operation of the line side converter.

Alternatively, the first parameterised modulation index value is in an upper section of the over-modulation range and the second parameterised modulation index value is in a lower section of the over-modulation range. Preferably, the feedback control module is fully enabled when the modulation index is at the upper end of the over-modulation range.

Alternatively, the first and second parameterised modulation index values are in a lower section of the over-modulation range or an upper section of the over-modulation range.

Alternatively, the first parameterised modulation index value is below a modulation index indicative of six-step operation of the line side converter and the second parameterised modulation index value is a notional modulation index value above the modulation index indicative of six-step operation of the line side converter.

Alternatively, the first parameterised modulation index value is a notional modulation index value above a modulation index indicative of six-step operation of the line side converter and the second parameterised modulation index value is below the modulation index indicative of six-step operation of the line side converter.

Alternatively, the first and second parameterised modulation index values are notional modulation index values above a modulation index indicative of six-step operation of the line side converter.

Preferably, the feedback control module is controlled such that its activation varies linearly between the first and second operational states based on the modulation index.

Preferably, controlling the feedback control module comprises applying an adjustment gain to the feedback control signal.

Preferably, the adjustment gain comprises a gain scheduling term, the scheduling term being dependent on the modulation index.

According to a second aspect of the invention, there is provided a controller for a line side converter of a power converter system comprising a feedback control module, a processor and a memory module, wherein the memory module comprises a set of program code instructions which when executed by the processor implement a method according to the first aspect of the invention.

According to a third aspect of the invention, there is provided a wind turbine including a power converter system comprising a controller according to the second aspect of the invention.

According to a fourth aspect of the invention, there is provided a computer program downloadable from a communication network and/or stored on a machine readable medium comprising program code instructions for implementing a method according to the first aspect of the invention.

BRIEF DESCRIPTION OF DRAWINGS

The above and other aspects of the invention will now be described, by way of example only, with reference to the accompanying drawings, in which.

Figure 1:
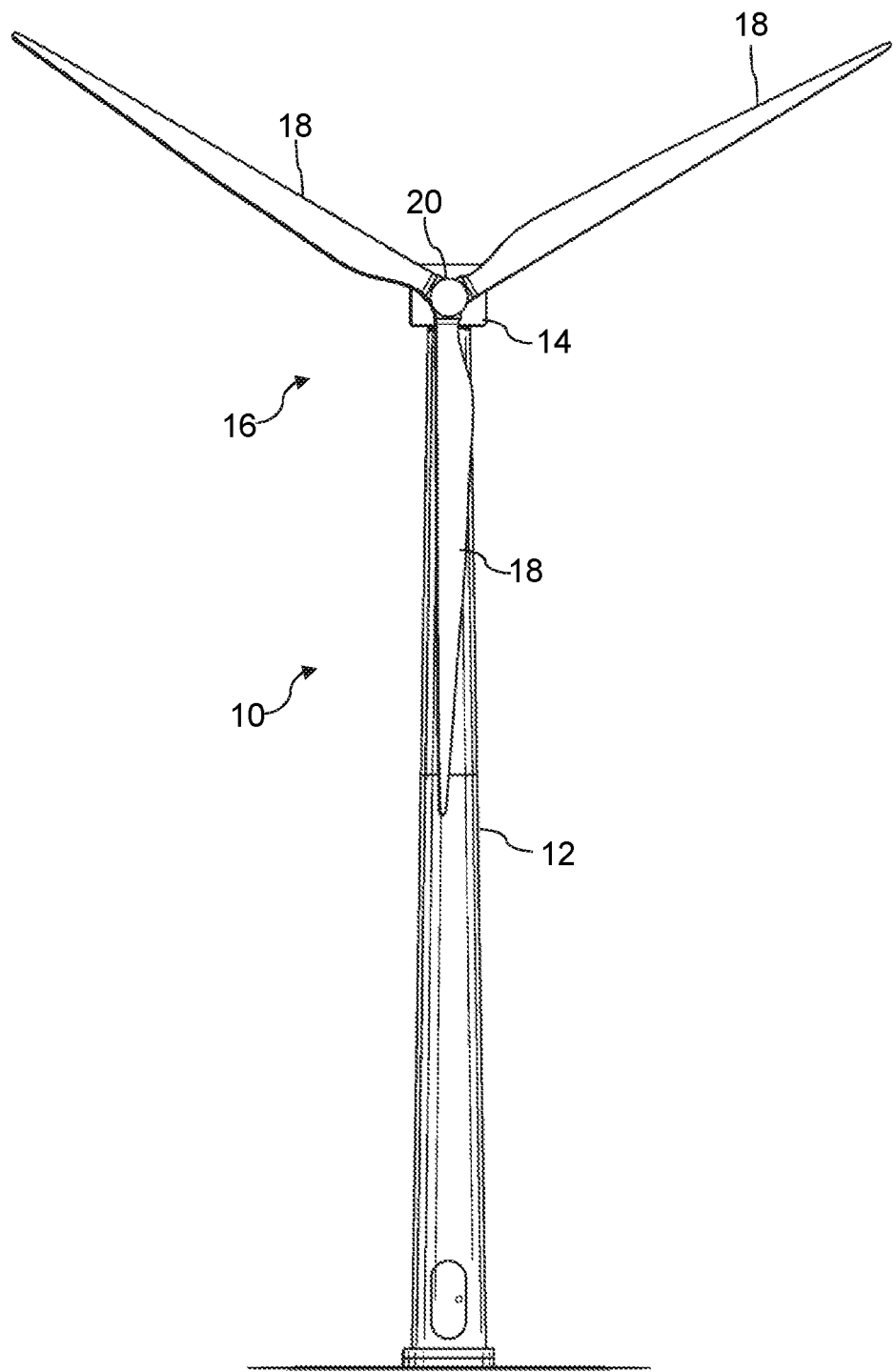
FIG. 1 is a schematic view of a wind turbine suitable for use with the invention.

In the drawings, like features are denoted by like reference signs.

SPECIFIC DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilised, and structural, logical and electrical changes may be made without departing from the scope of the invention as defined in the appended claims.

To provide context for the invention, FIG. 1 shows a wind turbine, generally designated as 10, of the kind that may be used with embodiments of the invention. In this example, the wind turbine 10 is a three-bladed upwind horizontal-axis wind turbine, which is the most common type of wind turbine in use. The wind turbine 10 comprises a tower 12 supporting a nacelle 14 to which a rotor 16 is mounted. The rotor 16 comprises a plurality of rotor blades 18 extending radially from a central hub 20. In this example, the rotor 16 comprises three rotor blades 18, although it will be apparent to the skilled reader that other configurations are possible. The rotor 16 is operatively coupled to a generator (not shown in FIG. 1) housed inside the nacelle 14. The generator is arranged to be driven by the rotor 16 to produce electrical power. Thus, the wind turbine 10 is able to generate electrical power from a flow of wind passing through a swept area of the rotor 16, causing it to rotate. In addition to the generator, the nacelle 14 houses miscellaneous components required for converting wind energy into electrical energy, along with various other components needed to operate, control, and optimise the performance of the wind turbine 10. It should be noted that the wind turbine 10 of FIG. 1 is referred to by way of example only, and that it would be possible to implement embodiments of the invention into many different types of wind turbines and their associated systems.

Figure 2:
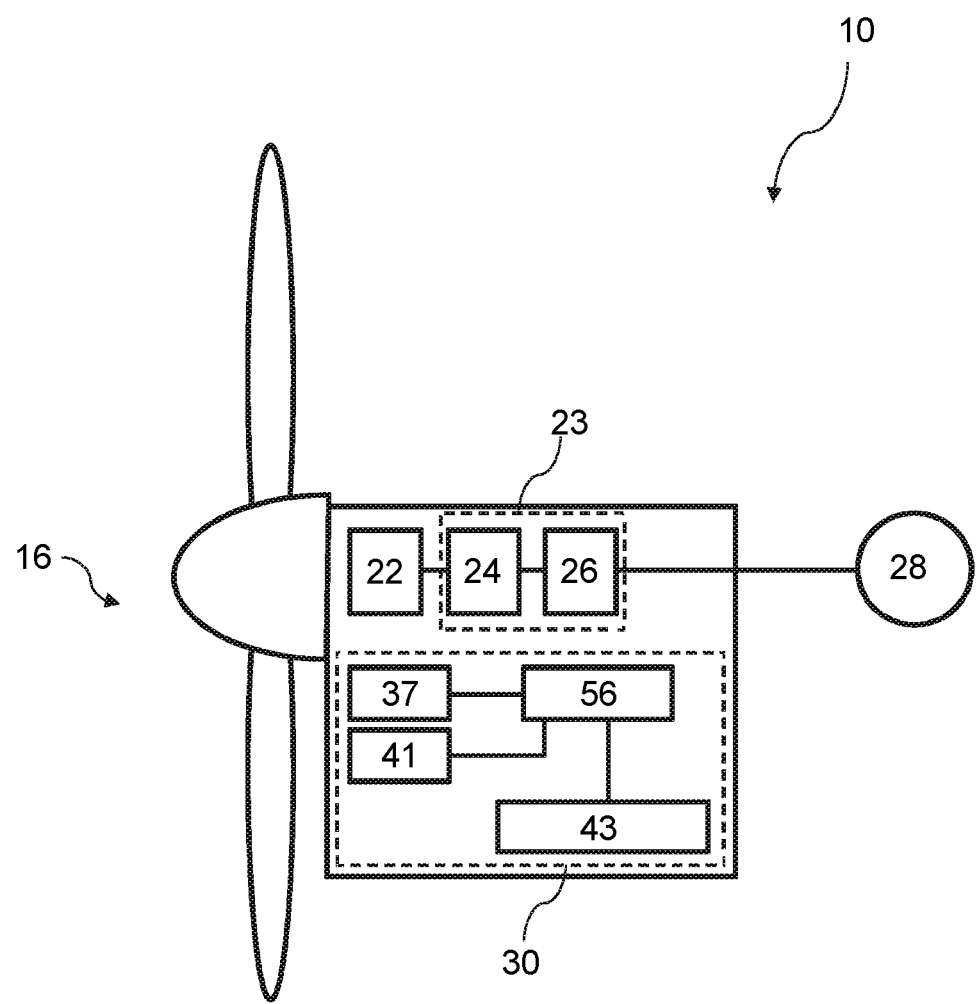
FIG. 2 is a schematic systems view of the wind turbine of FIG. 1.

With reference to FIG. 2, which shows a schematic illustration of the wind turbine 10 at a systems level, the wind turbine 10 further comprises a gearbox 22 and a power generation system 23 comprising the generator 24 and a power converter system 26. The gearbox 22 gears up the rotational speed of the rotor 16 and drives the generator 24, which in turn feeds generated power to the power converter system 26. In the illustrated embodiment, the wind turbine 10 is operatively connected to a load, such as an electrical grid 28, such that the power output of the power converter system 26 can be transmitted to the electrical grid 28. The skilled reader would be aware that a suite of different power transmission options exist.

The wind turbine 10 further comprises a control means 30 that is operable to monitor the operation of the wind turbine 10 and to issue commands thereto to achieve a set of control objectives. The control means 30 comprising a processor 56 configured to execute instructions that are stored in and read from a memory module 37 and/or an external data store (not shown). Measurement data may also be stored in the memory module 37, and recalled in order to execute processes according to the instructions being carried out by the processor 56. The control means 30 may also comprise a plurality of sensors 41 disposed within the wind turbine 10, together with a plurality of control units 43 in communication with the processor 56, for controlling the wind turbine 10 and performing a suite of safety and diagnostic monitoring functions, and carrying out corrective action if necessary.

Figure 3:
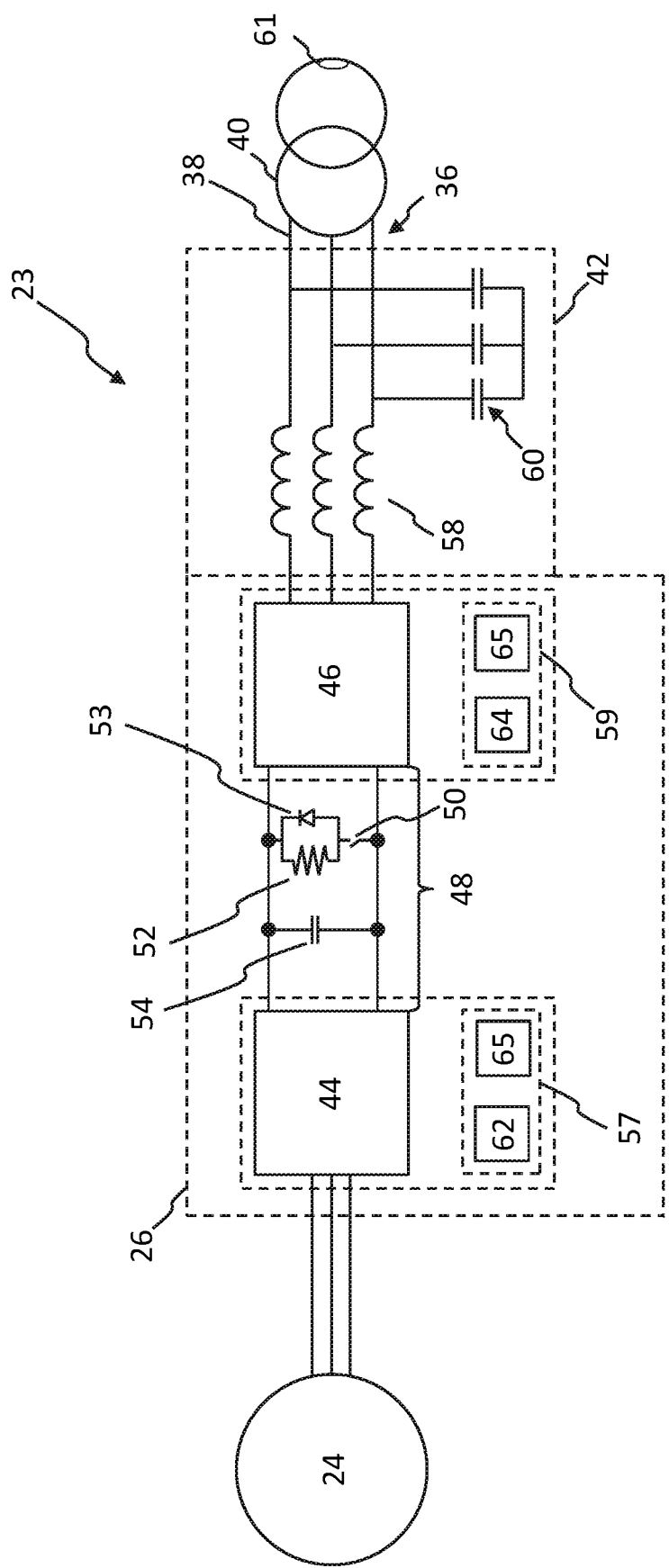
FIG. 3 is a schematic systems view of a power generation system for use in the wind turbine of FIG. 1.

FIG. 3 is a more detailed schematic overview of the power generation system 23 to which methods according to embodiments of the invention may be applied. The components of the power generation system 23 are conventional and, as such, familiar to the skilled reader, and so will only be described in overview. Moreover, it should be noted that the example of the power generation system 23 shown in FIG. 3 is representative only, and the skilled reader will appreciate that the methods described below may be applicable to many different configurations. For example, although the example is based on a full-scale converter architecture, in practice the invention may be used with other types of converters and in general terms the invention is suitable for use with all topologies, such as DFIG arrangements.

As already noted, the power generation system 23 comprises the generator 24, driven by the rotor 16 (not shown in FIG. 3) to produce electrical power, along with a low voltage link 36 defined by a bundle of low voltage lines 38 terminating at a coupling transformer 40. The coupling transformer 40 acts as a terminal that connects the power generation system 23 to a grid transmission or distribution line (not shown) that, in turn, connects to the electrical grid 28. Thus, electrical power produced by the power generation system 23 is delivered to the electrical grid 28 through the coupling transformer 40.

As already noted, the power generation system 23 also includes the power converter system 26, together with a filter 42, disposed between the generator 24 and the coupling transformer 40, to process the output of the generator 24 into a suitable waveform having the same frequency as the electrical grid 28 and the appropriate phase angle.

The filter 42, which in this embodiment comprises a respective inductor 58 with a respective shunted filter capacitor 60 for each of the low voltage lines 38, provides low-pass filtering for removing switching harmonics from the AC waveform. The low voltage lines 38 may also each include a respective circuit breaker (not shown) for managing faults within the power generation system 23.

As noted above, the low voltage link 36 terminates at the coupling transformer 40, which provides a required step-up in voltage. A high voltage output from the coupling transformer 40 defines a terminal 61, which acts to couple the power generation system 23 to the grid transmission line.

The power converter system 26 provides AC to AC conversion by feeding electrical current through a generator side converter 44 followed by a line side converter 46 in series for converting AC to DC and DC to AC respectively. The generator side converter 44 is connected to the line side converter 46 by a DC link 48. The DC link 48 comprises a plurality of switches, generally designated by 50, in series with respective resistors 52 and diodes 53 in a parallel arrangement, to act as a dump load to enable excess energy to be discharged, and a capacitor 54 providing smoothing for the DC output of the generator side converter 44. The smoothed DC output of the generator side converter 44 is received as a DC input by the line side converter 46, which creates a three-phase AC output for delivery to the coupling transformer 40.

Any suitable power converter system 26 may be used. In this embodiment, the generator side converter 44 and the line side converter 46 are defined by respective bridges of switching devices (not shown), for example in the configuration of a conventional two level back-to-back converter. Suitable switching devices for this purpose include integrated gate bipolar transistors (IGBTs) or metal-oxide-semiconductor field-effect transistors (MOSFETs). The switching devices are typically operated using modulated drive signals, selected as a function of a modulation index, based on drive signals issued from respective current controllers. In this instance, the generator side converter 44 comprises a generator side current controller 62 and the line side converter 46 comprises a line side current controller 64 (hereinafter, "the current controller 64"). The generator side current controller 62 and the current controller 64 form part of a generator side controller block 57 and a line side converter controller block 59 respectively, both of which include a range of other controllers and control modules, generally designated by 65, for diagnosing and controlling the performance of the line side converter 46 according to a conventional control strategy. The controller blocks 59, 57 also include a processor configured to execute instructions that are stored in and read from an internal/external memory module for controlling the controller blocks 59, 57 according to a control strategy.

The AC output leaves the power converter system 26 through the low voltage lines 38, one carrying each phase. The output voltage of the line side converter 46 is limited by the available DC link voltage, and the ability of the line side converter 46 to output a given voltage, in view of the DC link voltage, is measured by the modulation index, which characterises the operation of the line side converter 46 as being in either a linear modulation range or a non-linear, over-modulation range. In the linear modulation range, the line side converter 46 can only output 90.6% of the maximum possible output voltage. If over-modulation is used, for example as a result of an overvoltage event in the electrical grid 28, the output voltage of the line side converter 46 can be increased beyond 90.6% up to the maximum possible output voltage, in which case the line side converter 46 is said to operate in six-step operation.

Figure 4:
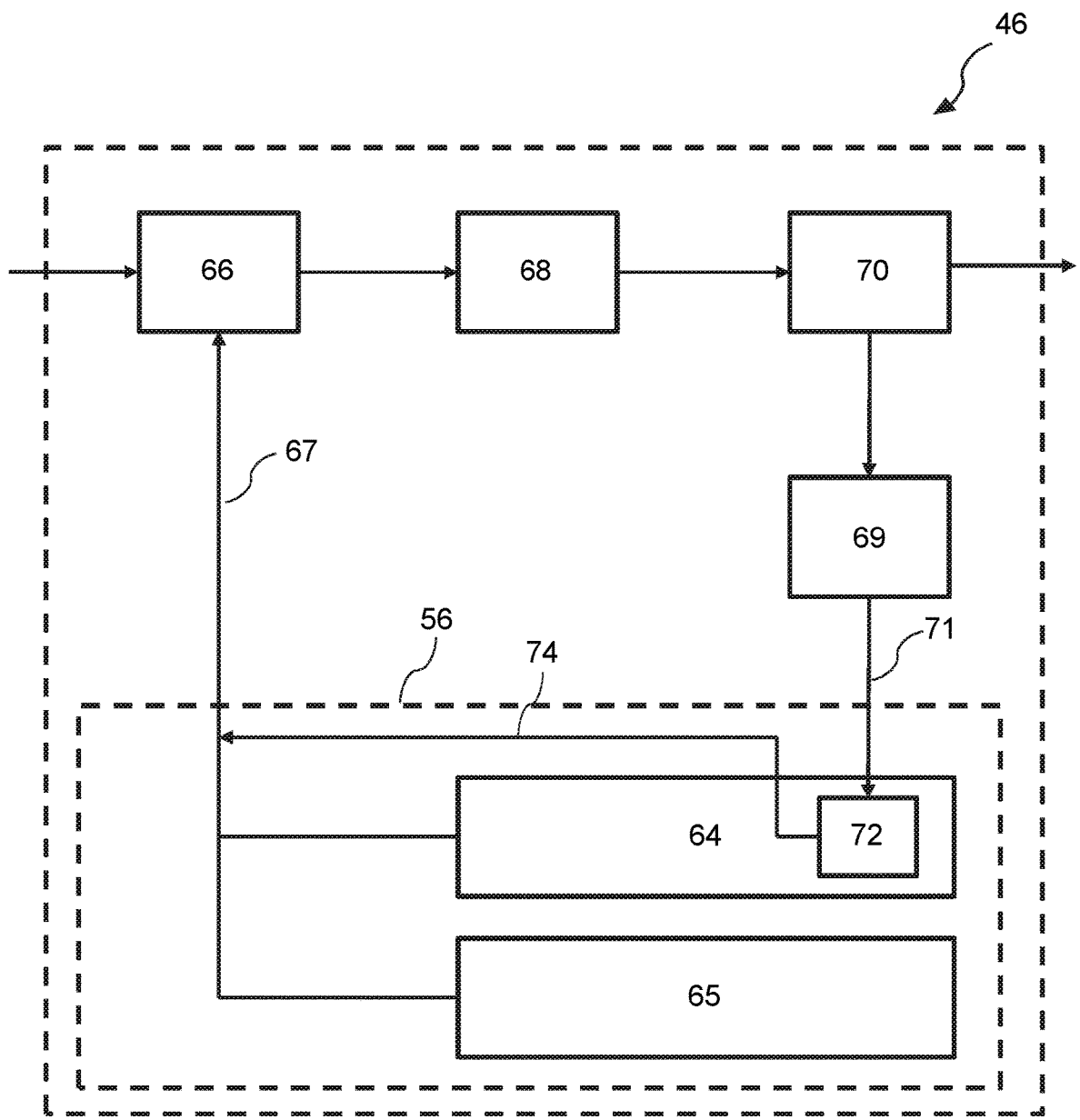
FIG. 4 is a schematic systems view of a line side converter for use in the power generation system of FIG. 3.

FIG. 4 provides a schematic overview of the primary components of the line side converter 46 to which methods according to embodiments of the invention may be applied. The components and their respective arrangement are conventional and, as such, will be familiar to the skilled reader, and so will only be described in overview. As noted above, the line side converter 46 comprises the current controller 64, along with other controllers 65 as part of line side converter controller block 59, together with an interface 66, a modulator 68 and a converter 70. At a general level, the current controller 64 is arranged to convert current references, based on the conditions of the electrical grid 28, to voltage references, and transform the voltage references into drive signals, designated by 67, for the modulator 68. Before reaching the modulator 68, the drive signals are processed by the interface 66 to be normalised. The modulator 68 then processes the normalised drive signals to produce modulated drive signals, according to a conventional modulation strategy of the line side converter 46, which are used to drive the converter 70 to produce the AC output for delivery to the filter 42 of the power generation system 23.

The line side converter 46 further comprises a data conditioning module 69, which forms part of a feedback path within the line side converter 46, and functions to evaluate the modulation index issued from the converter 70 and send a modulation index control signal 71, indicative of the evaluated modulation index, to at least one feedback control module 72 within the current controller 64. The feedback control module 72 functions to output a feedback control signal 74 based on the modulation index control signal 71 obtained from the data conditioning module 69, for modifying the drive signals 67 processed by the interface 66 based on the operational conditions of the line side converter 46. The feedback control module 72 could be, as one example, a grid harmonic damping controller, which, under a conventional control strategy, functions to dampen harmonics from the electrical grid 28 within a predetermined frequency range. According to the conventional control strategy, the grid harmonic damping control module is disabled when the line side converter 46 is operated in the over-modulation range to enable the line side converter 46 to make full use of the over-modulation range.

The inventors have recognised the benefits of being able to control the feedback control module 72, according to a new control strategy, to adjust the feedback control signal 74 based on the modulation index when the line side converter 46 is operating in the over-modulation range to ensure the stability and robustness of the power generation system 23.

Figure 5:
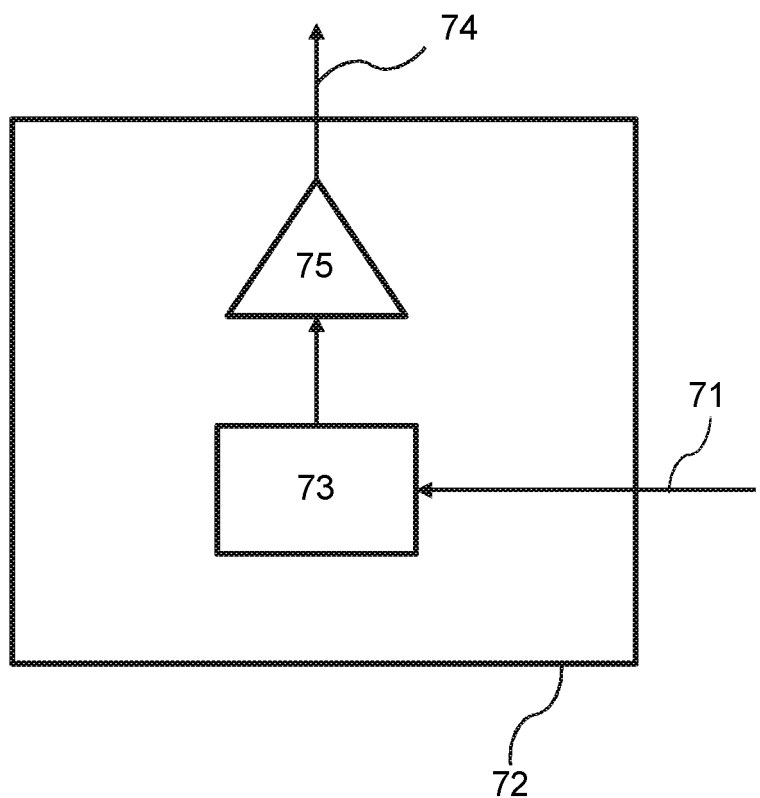
FIG. 5 is a schematic view of a feedback control module for use in the line side converter of FIG. 4.

The feedback control signal 74 is adjusted by scheduling the activation of the feedback control module 72 between a first operational state and a second operational state. To that end, and with reference to FIG. 5, the feedback control module 72 generally comprises a process module 73, for carrying out the specific function of the feedback control module 72, and a gain 75 for applying an adjustment gain to the feedback control signal 74 according to the modulation index control signal 71. The adjustment gain ranges from unity, meaning that the feedback control module 72 is fully enabled, defining the first operational state, to zero, which renders the feedback control module 72 inactive, defining the second operational state. Activation of the feedback control module 72 is controlled when the modulation index control signal 71 indicates that the modulation index is between first and second parameterised modulation index values $m_1$, $m_2$.

FIGS. 6a to 6d show examples of how activation of the feedback control module 72 may be controlled according to an embodiment of the new control strategy. Each figure shows two plots, a lower plot and an upper plot. The lower plot shows the modulation index ranging from zero, indicating the start of the non-linear, over-modulation range, to the maximum modulation index value indicating six-step operation. The upper plot illustrates the associated response of the feedback control module 72 according to the new control strategy.

Figure 6A:
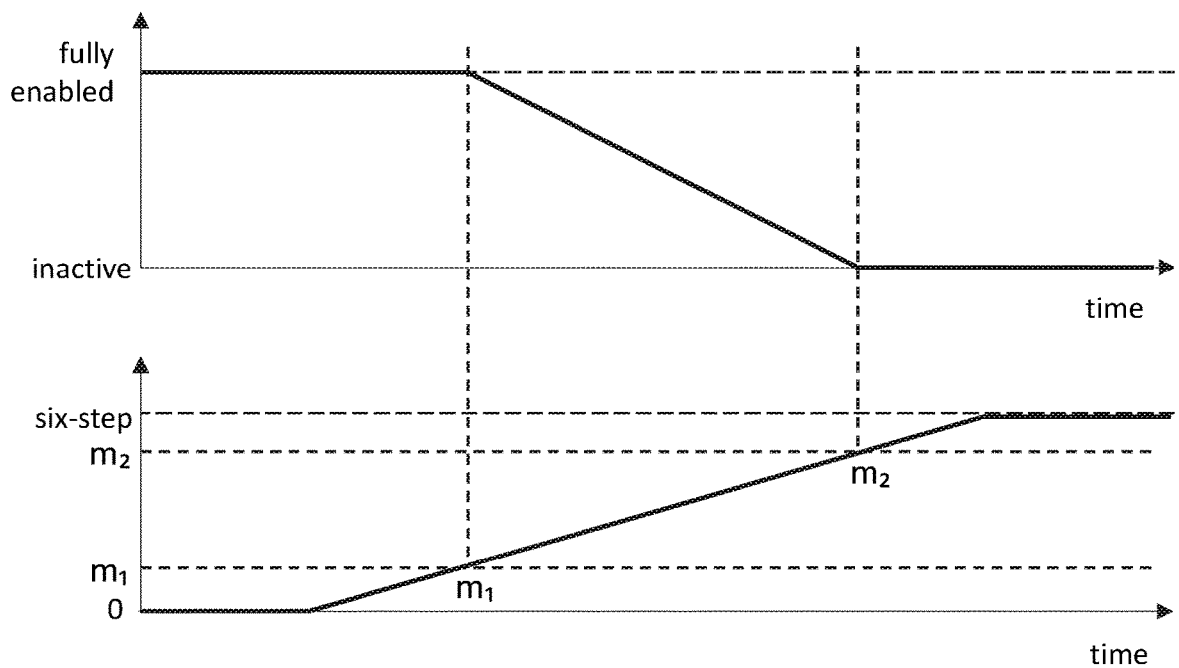
FIGS. 6a to 6d are illustrations of the response of the feedback control module of FIG. 5 based on a control strategy according to the invention.

In FIG. 6a, and with reference to the lower plot, the first parameterised modulation index value $m_1$ is in a lower section of the over-modulation range and the second parameterised modulation index value $m_2$ is in an upper section of the over-modulation range. With reference to the upper plot, the feedback control module 72 is controlled so as to be fully enabled as the modulation index enters the over-modulation range, and remains fully enabled as the modulation index increases. When the modulation index equals the first parameterised modulation index value $m_1$, the activation of the feedback control module 72 begins to decrease, resulting in a partially enabled feedback control module 72. The activation of the feedback control module 72 continues to decrease, according to a linear function of the modulation index, until the modulation index reaches the second parameterised modulation index value $m_2$, at which point the feedback control module 72 is disabled, rendering it inactive. The feedback control module 72 remains disabled as the modulation index increases to a value indicative of six-step operation.

As the modulation index decreases from the value indicative of six-step operation, the feedback control module 72 remains inactive, until the modulation index equals the second parameterised modulation index value $m_2$, from where a continued decrease of the modulation index increases the activation of the feedback control module 72 to a point at which the modulation index equals the first parameterised modulation index value $m_1$. At this point, the feedback controller 72 is fully enabled, and remains so if the modulation index further decreases.

Figure 6B:
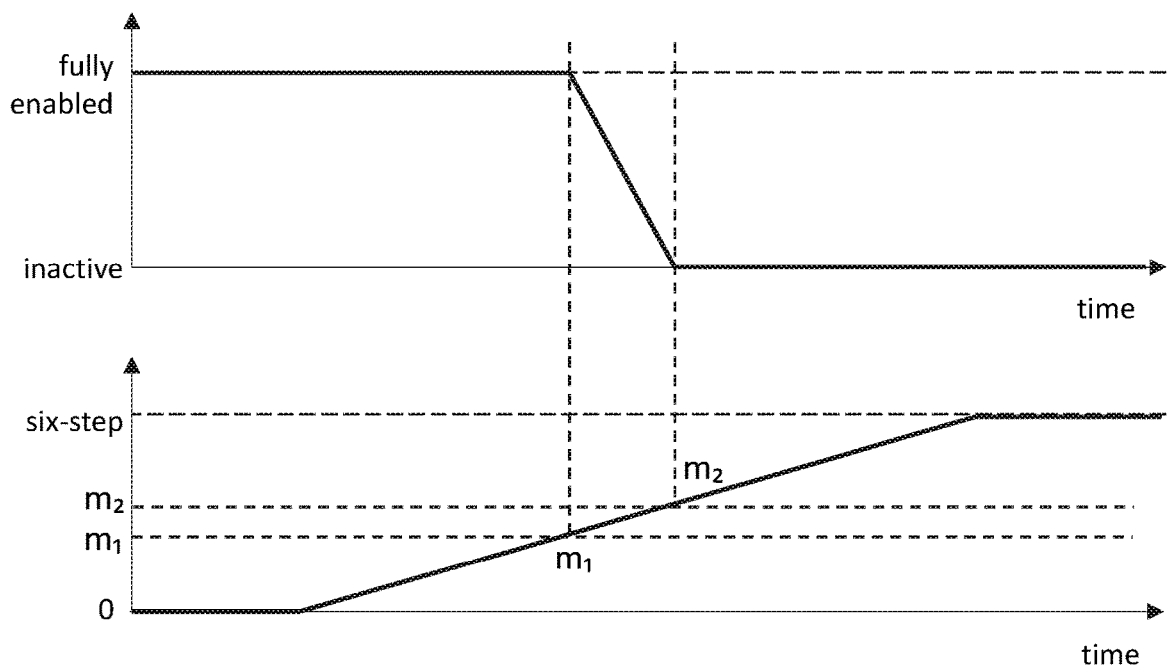

Activation of the feedback control module 72 can be altered by positioning the first and second parameterised modulation index values $m_1$, $m_2$ elsewhere within the lower and the upper sections of the over-modulation range respectively. FIG. 6b shows an example of the new control strategy in which the first and second parameterised modulation index values $m_1$, $m_2$ are spaced closer together within the over-modulation range. This enables a quicker translation from a fully enabled state to a disabled state, and vice versa.

Figure 6C:
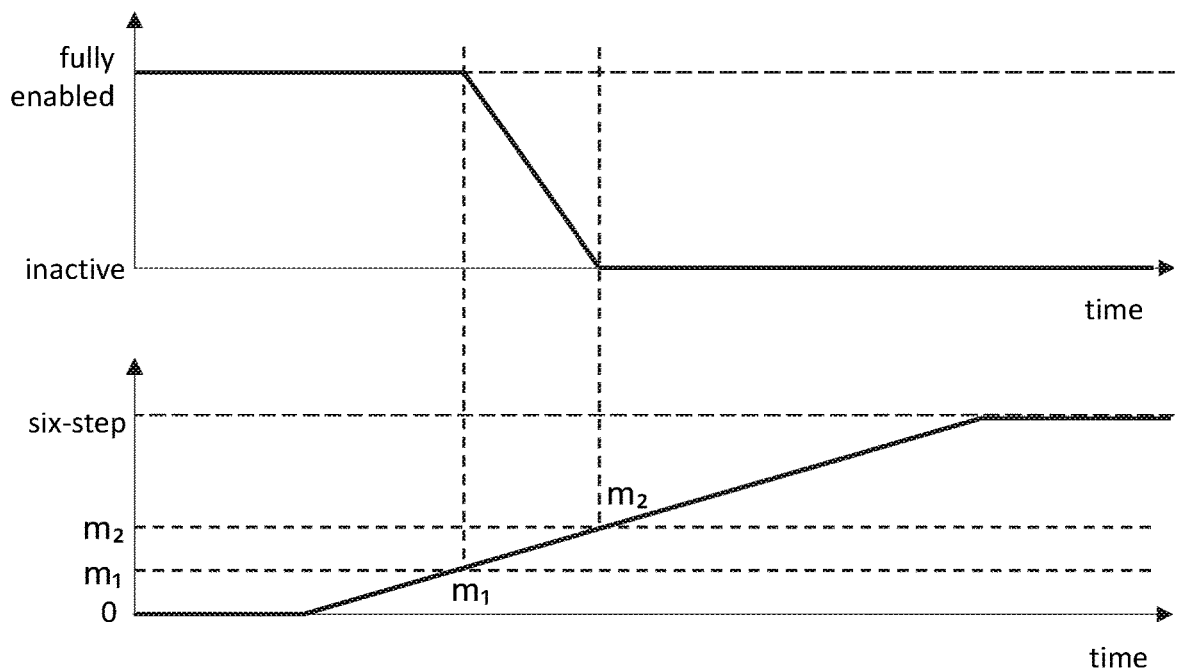
Figure 6D:
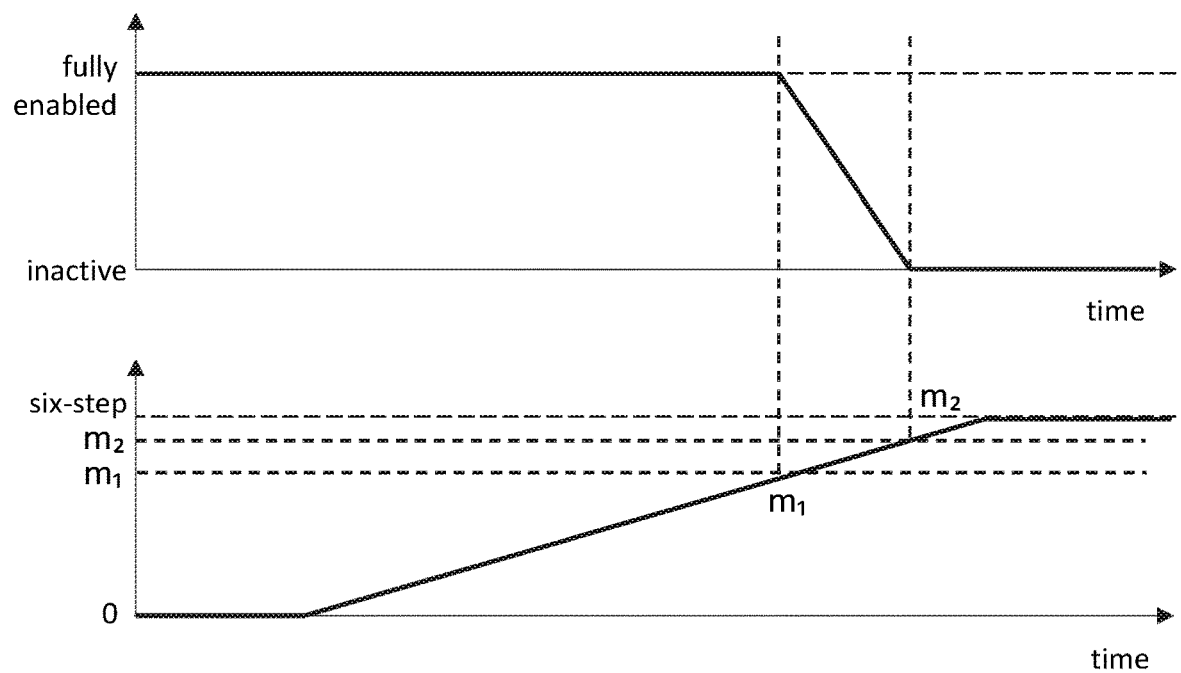

In other examples, the first and second parameterised modulation index values $m_1$, $m_2$ are both positioned within the lower section of the over-modulation range, as shown in FIG. 6c, or the upper section of the over-modulation range, as shown in FIG. 6d.

FIGS. 7a to 7d show examples of how activation of the feedback control module 72 may be controlled according to another embodiment of the new control strategy. As before, each figure comprises a lower plot showing the modulation index ranging from zero, indicating the start of the non-linear, over-modulation range, to the maximum modulation index value indicating six-step operation, and an upper plot illustrating the associated response of the feedback control module 72.

Figure 7A:
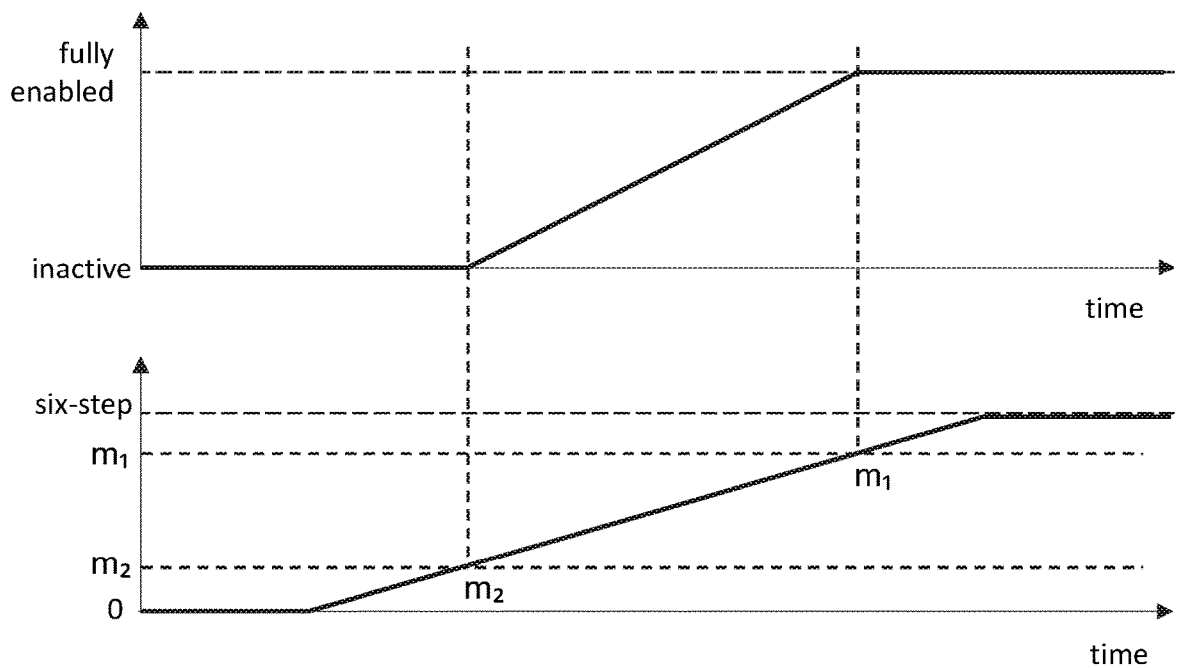
FIGS. 7a to 7d are illustrations of the response of the feedback control module of FIG. 5 based on a different control strategy according to the invention; and, FIGS. 8a and 8b are illustrations of the response of the feedback control module of FIG. 5 based on a different control strategy according to the invention.

In FIG. 7a, and with reference to the lower plot, the first parameterised modulation index value $m_1$ is in the upper section of the over-modulation range and the second parameterised modulation index value $m_2$ is in the lower section of the over-modulation range. With reference to the upper plot, the feedback control module 72 is controlled so as to be inactive as the modulation index enters the over-modulation range, and remains inactive as the modulation index increases. When the modulation index equals the second parameterised modulation index value $m_2$, the activation of the feedback control module 72 begins to increase, resulting in a partially enabled feedback control module 72. The activation of the feedback control module 72 continues to increase, according to a linear function of the modulation index, until the modulation index reaches the first parameterised modulation index value $m_1$, at which point the feedback control module 72 is fully enabled. The feedback control module 72 remains fully enabled as the modulation index increases to a value indicative of six-step operation.

As the modulation index decreases from the value indicative of six-step operation, the feedback control module 72 remains fully enabled, until the modulation index equals the first parameterised modulation index value $m_1$, from where a continued decrease of the modulation index decreases the activation of the feedback control module 72 to a point at which the modulation index equals the second parameterised modulation index value $m_2$. At this point, the feedback controller 72 is inactive, and remains so if the modulation index further decreases.

Figure 7B:
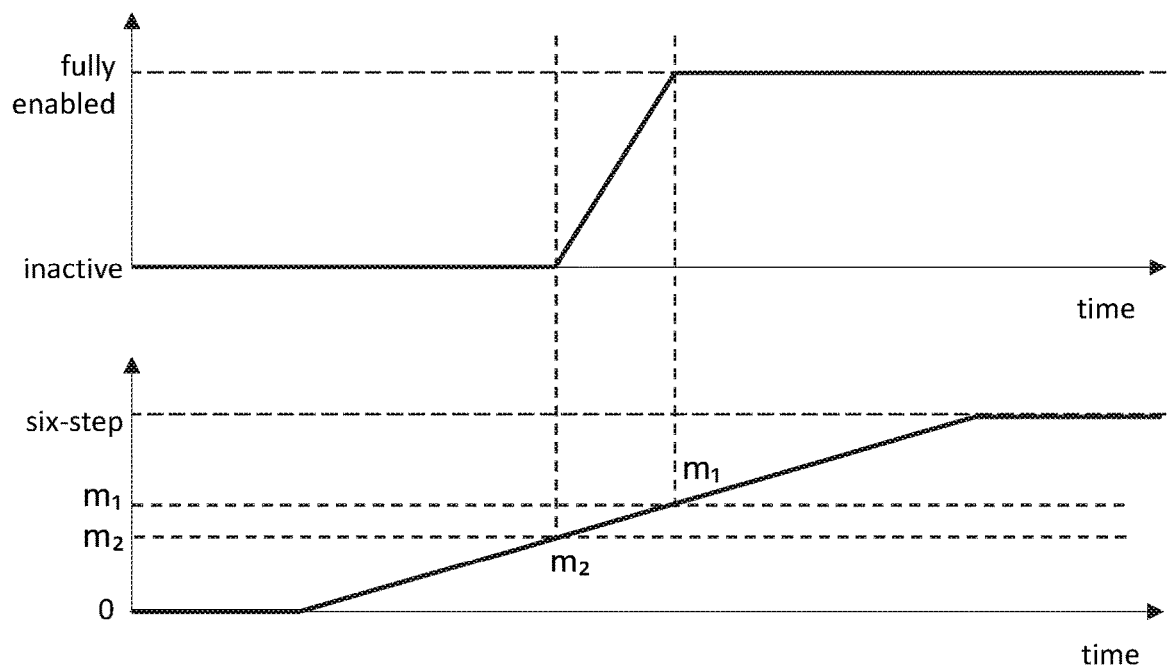

As with the previous embodiment, activation of the feedback control module 72 according to this embodiment of the new control strategy can also be altered by positioning the first and second parameterised modulation index values $m_1$, $m_2$ elsewhere within the lower and the upper sections of the over-modulation range respectively. FIG. 7b shows an example of the new control strategy in which the first and second parameterised modulation index values $m_1$, $m_2$ are spaced closer together within the over-modulation range. This enables a quicker translation from a disabled state to a fully enabled state, and vice versa.

Figure 7C:
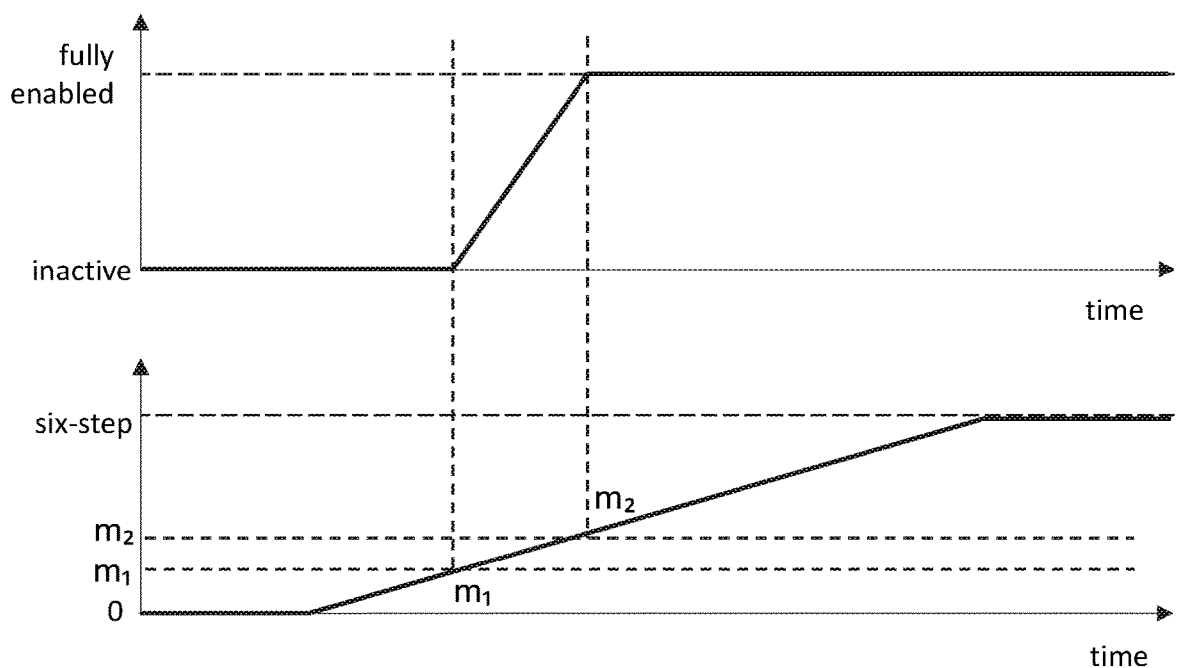
Figure 7D:
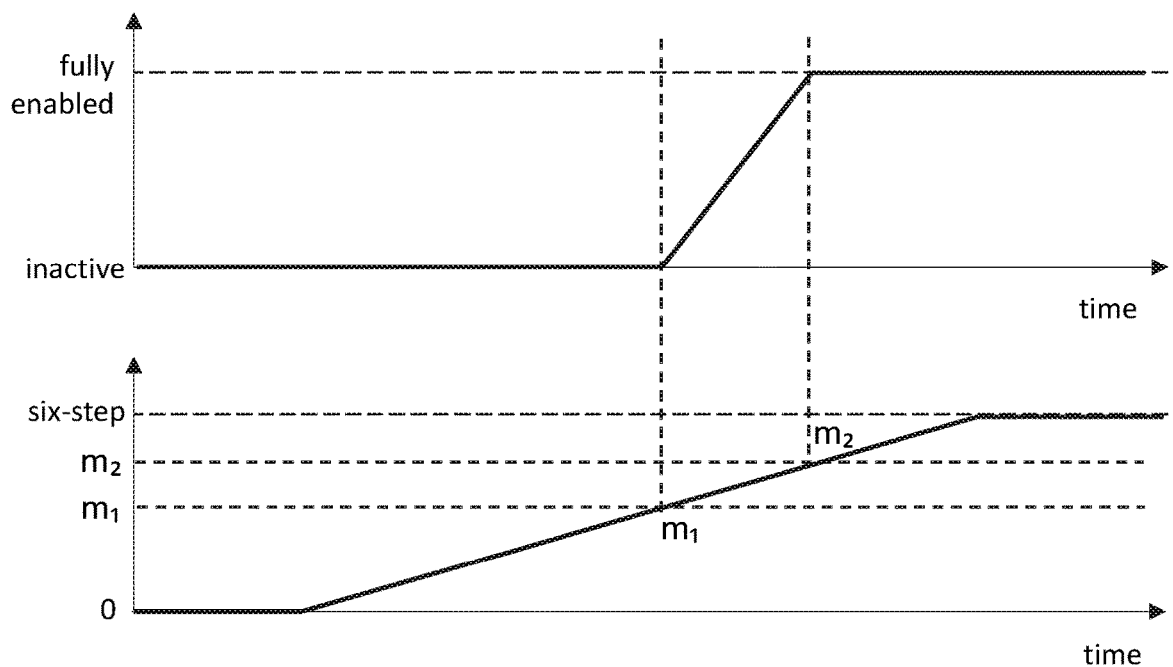

In other examples of this embodiment of the new control strategy, the first and second parameterised modulation index values $m_1$, $m_2$ are both positioned within the lower section of the over-modulation range, as shown in FIG. 7c, or the upper section of the over-modulation range, as shown in FIG. 7d.

Figure 8A:
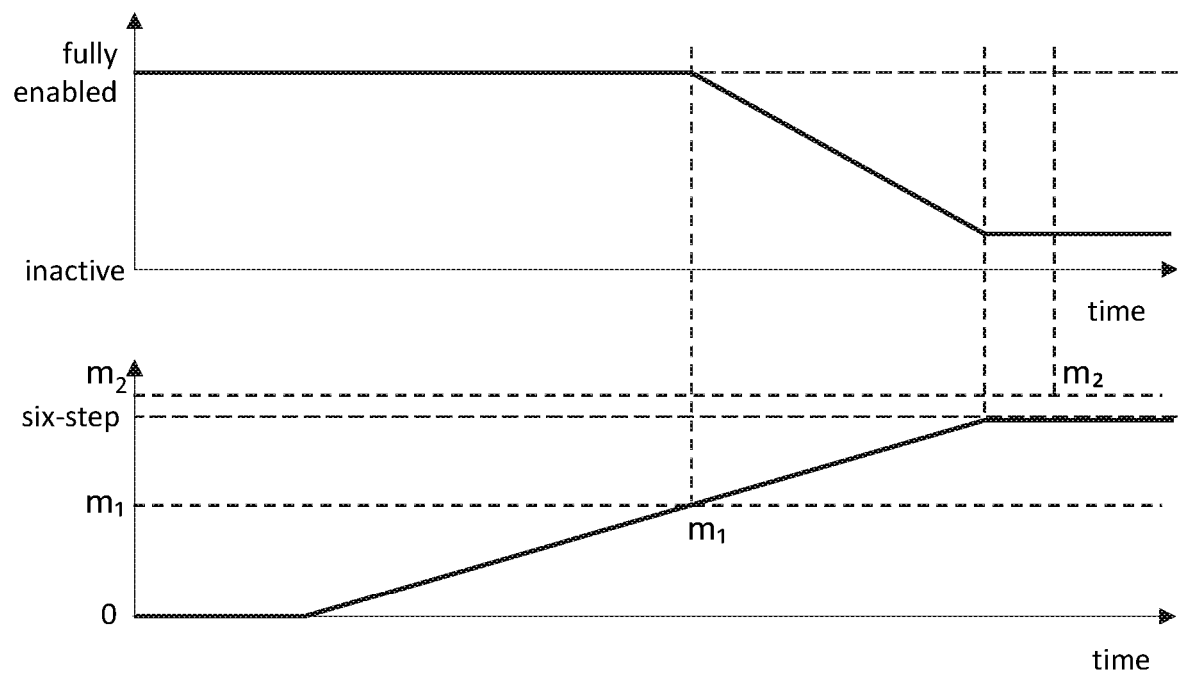
Figure 8B:
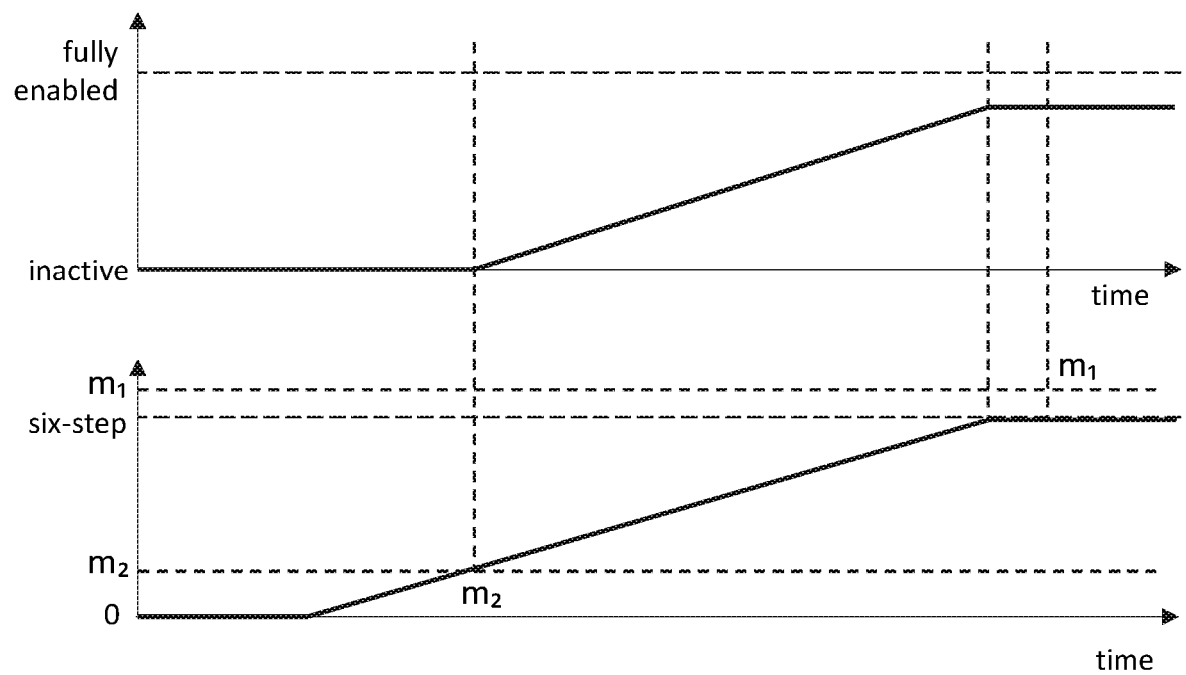

FIGS. 8a and 8b shows examples of how activation of the feedback control module 72 may be controlled according to another embodiment of the new control strategy. As before, the figures comprise a lower plot showing the modulation index ranging from zero, indicating the start of the non-linear, over-modulation range, to the maximum modulation index value indicating six-step operation, and an upper plot illustrating the associated response of the feedback control module 72.

In FIG. 8a, and with reference to the lower plot, the first parameterised modulation index value $m_1$ is in the over-modulation range, below the maximum modulation index, and the second parameterised modulation index value $m_2$ is set as a notional value exceeding the maximum modulation index. With reference to the upper plot, the feedback control module 72 is controlled so as to be fully enabled as the modulation index enters the over-modulation range, and remains fully enabled as the modulation index increases. When the modulation index equals the first parameterised modulation index value $m_1$, the activation of the feedback control module 72 begins to decrease, resulting in a partially enabled feedback control module 72. The feedback control module 72 remains partially enabled when the modulation index reaches the maximum modulation index value since the second parameterised modulation index value $m_2$ cannot be reached.

Conversely, with reference to FIG. 8b, the first parameterised modulation index value $m_1$ could be set as a notional value greater than the maximum modulation index and the second parameterised modulation index value $m_2$ could be set in the over-modulation range, below the maximum modulation index indicative of six-step operation. With reference to the upper plot, the feedback control module 72 is controlled so as to be inactive as the modulation index enters the over-modulation range, and remains inactive as the modulation index increases. When the modulation index equals the second parameterised modulation index value $m_2$, the activation of the feedback control module 72 begins to increase, resulting in a partially enabled feedback control module 72. The feedback control module 72 remains partially enabled when the modulation index reaches the maximum modulation index value since the first parameterised modulation index value $m_1$ cannot be reached.

In a further embodiment, the first and second parameterised modulation index values $m_1$, $m_2$ could both be set as notional values exceeding the maximum modulation index. In this case, neither value can be achieved, so activation of the feedback control module 72 would not be scheduled, and the feedback control module 72 would remain either inactive or fully enabled across the over-modulation range.

In the examples given above, the adjustment gain, and so the activation of the feedback control module 72, varies linearly between the first and second parametrised modulation index values $m_1$, $m_2$, according to the modulation index control signal 71, between unity and zero. However, it will be apparent to the skilled reader that the adjustment gain could be a non-linear function of the modulation index control signal 71.

It will be appreciated by those skilled in the art that the invention has been described by way of example only, and that a variety of alternative approaches may be adopted without departing from the scope of the invention, as defined by the appended claims. For example, as noted above, the current controller 64 is shown herein with one feedback control module 72. This was done in order to aid the description of the invention, but the skilled reader will understand that, in practice, the current controller 64 will include a plurality of feedback control modules, all of which can be controlled according to the invention. For example, the plurality of feedback control modules may comprise at least two feedback control modules that are controlled according to different embodiments of the new control strategy as described in relation to FIGS. 6a to 6d and 7a to 7d, for example. It will also be understood by the skilled reader that the invention is not limited to controlling feedback control modules within a current controller, and that the invention can equally be applied to schedule the activation of other feedback control modules not in the current controller, but forming part of the larger line side converter controller block 59. Moreover, it is intended that the term "feedback control module" covers controllers, regulators and the like, forming part of a feedback path within the line side converter controller block 59.

The invention claimed is:

1. A method of controlling a line side converter of a power converter system operating in an over-modulation range, the line side converter comprising a controller comprising a feedback control module configured to output a feedback control signal for modifying a drive signal received by a modulator, the method comprising:
determining a modulation index within the over-modulation range; and,
controlling the feedback control module to adjust the feedback control signal based on the modulation index.

2. The method of claim 1, wherein the feedback control module is controlled between a first operational state when the modulation index equals a first parametrised modulation index value ($m_1$) and a second operational state when the modulation index equals a second parametrised modulation value ($m_2$).

3. The method of claim 2, wherein the first and second parametrised modulation index values ($m_1$, $m_2$) are within the over-modulation range.

4. The method of claim 2, wherein the first parametrised modulation index value ($m_1$) is in a lower section of the over-modulation range and the second parametrised modulation index value ($m_2$) is in an upper section of the over-modulation range.

5. The method of claim 2, wherein the first parametrised modulation index value ($m_1$) is in an upper section of the over-modulation range and the second parametrised modulation index value ($m_2$) is in a lower section of the over-modulation range.

6. The method of claim 2, wherein the first and second parametrised modulation index values ($m_1$, $m_2$) are in a lower section of the over-modulation range or an upper section of the over-modulation range.

7. The method of claim 2, wherein the first parametrised modulation index value ($m_1$) is below a modulation index indicative of six-step operation of the line side converter and the second parameterised modulation index value ($m_2$) is a notional modulation index value above the modulation index indicative of six-step operation of the line side converter.

8. The method of claim 2, wherein the first parameterised modulation index value ($m_1$) is a notional modulation index value above a modulation index indicative of six-step operation of the line side converter and the second parameterised modulation index value ($m_2$) is below the modulation index indicative of six-step operation of the line side converter.

9. The method of claim 2, wherein the first and second parameterised modulation index values ($m_1$, $m_2$) are notional modulation index values above a modulation index indicative of six-step operation of the line side converter.

10. The method of claim 2, wherein controlling the feedback control module comprises controlling activation of the feedback control module, and wherein the first operational state comprises a fully enabled state and the second operational state comprises an inactive state.

11. The method of claim 1, wherein the feedback control module is controlled such that its activation varies linearly between the first and second operational states based on the modulation index.

12. The method of claim 1, wherein controlling the feedback control module comprises applying an adjustment gain to the feedback control signal.

13. The method of claim 12, wherein the adjustment gain comprises a gain scheduling term, the scheduling term being dependent on the modulation index.

14. A controller for a line side converter of a power converter system comprising a feedback control module, a processor and a memory module, wherein the memory module comprises a set of program code instructions which when executed by the processor implement an operation of controlling a line side converter of a power converter system operating in an over-modulation range, the line side converter comprising a controller comprising a feedback control module configured to output a feedback control signal for modifying a drive signal received by a modulator, the operation comprising:
determining a modulation index within the over-modulation range; and
controlling the feedback control module to adjust the feedback control signal based on the modulation index.

15. The controller of claim 14, wherein the feedback control module is controlled between a first operational state when the modulation index equals a first parameterised modulation index value ($m_1$) and a second operational state when the modulation index equals a second parameterised modulation value ($m_2$).

16. The controller of claim 15, wherein the first and second parameterised modulation index values ($m_1$, $m_2$) are within the over-modulation range.

17. The controller of claim 16, wherein the first parameterised modulation index value ($m_1$) is in a lower section of the over-modulation range and the second parameterised modulation index value ($m_2$) is in an upper section of the over-modulation range.

18. A computer program downloadable from a communication network and/or stored on a machine readable medium comprising program code instructions for implementing an operation of controlling a line side converter of a power converter system operating in an over-modulation range, the line side converter comprising a controller comprising a feedback control module configured to output a feedback control signal for modifying a drive signal received by a modulator, the operation comprising:
   determining a modulation index within the over-modulation range; and
   controlling the feedback control module to adjust the feedback control signal based on the modulation index.

19. The computer program of claim 18, wherein the feedback control module is controlled between a first operational state when the modulation index equals a first parameterised modulation index value ($m_1$) and a second operational state when the modulation index equals a second parameterised modulation value ($m_2$).

20. The controller of claim 19, wherein the first and second parameterised modulation index values ($m_1$, $m_2$) are within the over-modulation range.

* * * * *